United States Patent
Dubey et al.

(10) Patent No.: US 10,589,723 B1
(45) Date of Patent: Mar. 17, 2020

(54) IMAGING SYSTEM

(71) Applicant: Ford Global Technologies, LLC, Dearborn, MI (US)

(72) Inventors: Prashant Dubey, Canton, MI (US); Segundo Baldovino, Novi, MI (US); Jose Garcia Crespo, Bloomfield Township, MI (US); Venkatesh Krishnan, Canton, MI (US); Andre Sykula, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/138,097

(22) Filed: Sep. 21, 2018

(51) Int. Cl.
*H02P 1/04* (2006.01)
*B60S 1/08* (2006.01)
*G06K 9/00* (2006.01)
*B60H 1/00* (2006.01)
*G06K 9/52* (2006.01)
*G06K 9/46* (2006.01)

(52) U.S. Cl.
CPC ........ *B60S 1/0844* (2013.01); *B60H 1/00735* (2013.01); *G06K 9/00791* (2013.01); *G06K 9/4661* (2013.01); *G06K 9/52* (2013.01)

(58) Field of Classification Search
CPC .......................... G05D 23/1924; H02H 3/085
See application file for complete search history.

(56) References Cited

U.S. PATENT DOCUMENTS

| | | | |
|---|---|---|---|
| 3,697,863 A * | 10/1972 | Kilner | H01C 7/022 361/106 |
| 4,159,874 A * | 7/1979 | Dearth | G01N 21/86 250/559.17 |
| 5,508,595 A | 4/1996 | Schaefer | |
| 5,610,756 A | 3/1997 | Lynam et al. | |
| 9,734,425 B2 | 8/2017 | Zhong et al. | |
| 2003/0233172 A1 * | 12/2003 | Granqvist | G05D 23/1924 700/276 |
| 2012/0170119 A1 | 7/2012 | Chu et al. | |
| 2012/0218674 A1 | 8/2012 | Schultz et al. | |
| 2013/0200984 A1 | 8/2013 | Matthiesen et al. | |
| 2013/0340409 A1 | 12/2013 | Hodgson et al. | |
| 2016/0297406 A1 | 10/2016 | Jansen et al. | |

(Continued)

FOREIGN PATENT DOCUMENTS

| CN | 202413712 A | 9/2012 |
|---|---|---|
| CN | 105657884 A | 6/2016 |

(Continued)

OTHER PUBLICATIONS

"Henkel PTC Inks Lend New Efficiency, Functionality to Heating Applications", The Electronics Group of Henkel, Press release Oct. 17, 2014.

(Continued)

*Primary Examiner* — Karen Masih
(74) *Attorney, Agent, or Firm* — Frank A. MacKenzie; Bejin Bieneman PLC

(57) ABSTRACT

A sensor having a positive temperature coefficient shroud is described, as well as a computing system to control actuation of the positive temperature coefficient shroud. According to one example, the computing system executes a method that actuates the positive temperature coefficient shroud of the sensor based on a transmittance parameter of the sensor.

19 Claims, 11 Drawing Sheets

(56) References Cited

U.S. PATENT DOCUMENTS

| | | |
|---|---|---|
| 2017/0257910 A1 | 9/2017 | Oldenziji et al. |
| 2018/0095057 A1 | 4/2018 | McQuillen et al. |
| 2019/0039438 A1 | 2/2019 | Wakisaka et al. |

FOREIGN PATENT DOCUMENTS

| | | |
|---|---|---|
| CN | 106427902 A | 2/2017 |
| CN | 107091548 A | 8/2017 |
| DE | 10346270 A1 | 7/2004 |
| EP | 1943130 B1 | 5/2010 |
| WO | 2017151348 A1 | 9/2017 |

OTHER PUBLICATIONS

Non-Final Office Action dated Aug. 2, 2019 re U.S. Appl. No. 16/138,112 filed Sep. 21, 2018.

* cited by examiner

←— 600

←— 700

←— 800

←— 900

US 10,589,723 B1

IMAGING SYSTEM

BACKGROUND

When a sensor is exposed to an outdoor environment, debris can build up on a cover of the sensor and thereby block light from entering the sensor and/or obscure imaging. When the sensor is used to autonomously drive a vehicle, cleaning debris from the sensor can assist in autonomous navigation.

DETAILED DESCRIPTION

Figure 1:
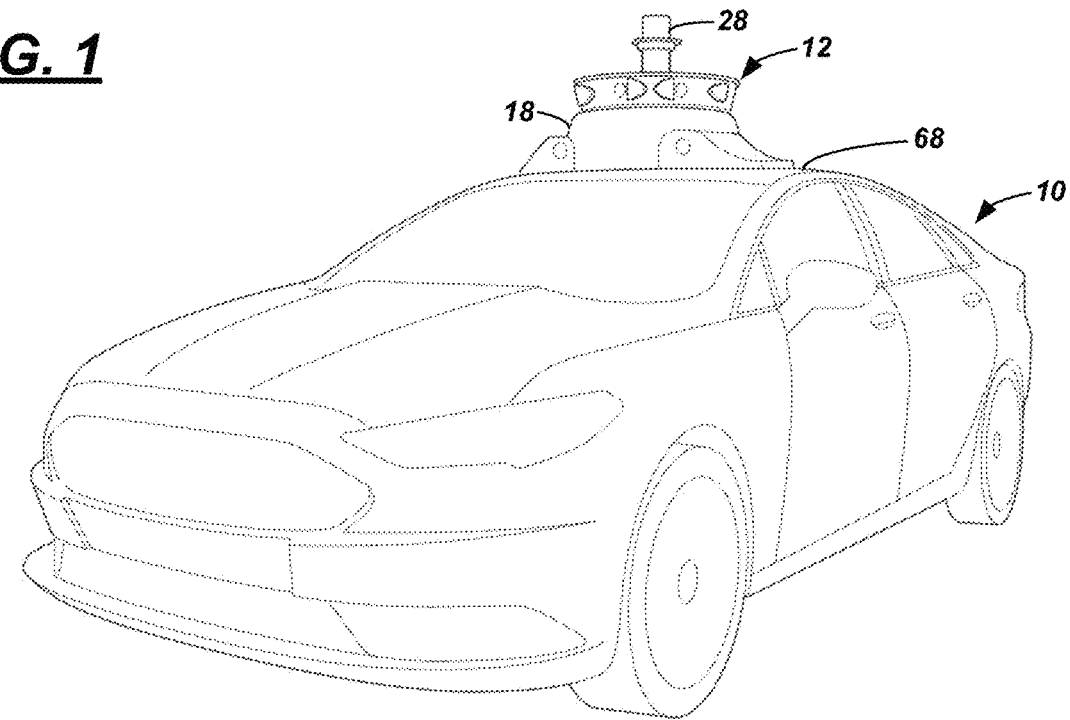
FIG. 1 is a perspective view of a vehicle comprising an imaging system that comprises a housing carrying a sensor suite.
Figure 2:
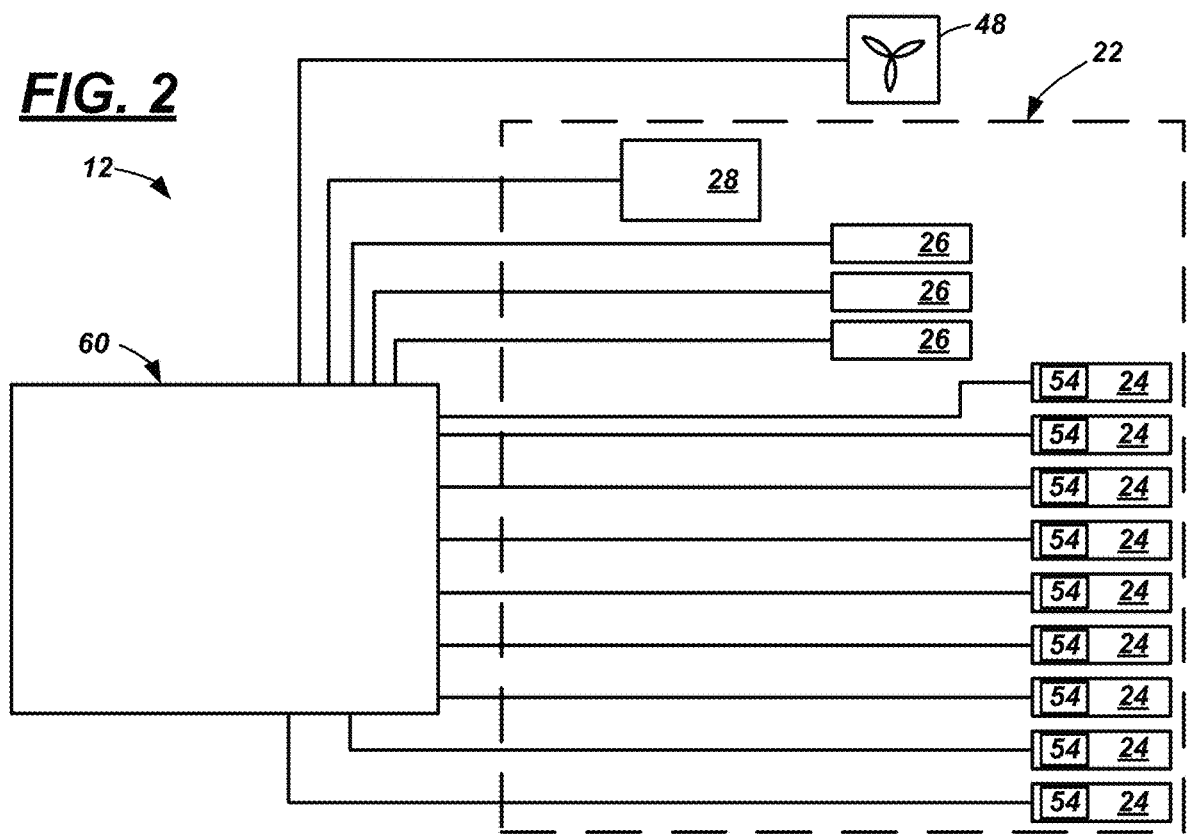
FIG. 2 is a schematic diagram of the imaging system illustrating the sensor suite and a computer of the imaging system.

An imaging system is described in detail below that includes at least one sensor and one or more computers that control a positive temperature coefficient (PTC) shroud located at the sensor (e.g., at a periphery of a cover thereof). For example, a system is disclosed herein that comprises: a processor; and memory storing instructions, executable by the processor, that comprise, to: determine a transmittance parameter for a sensor using a set of noise values and a set of error values; and when the transmittance parameter is less than a transmittance threshold value, then actuate a positive temperature coefficient (PTC) shroud of the sensor.

According to the at least one example set forth above, the instructions further comprise, to: command the computer to actuate the PTC shroud.

According to the at least one example set forth above, the sensor comprises an active cooler electrically coupled to the PTC shroud, and the instructions further comprise, to: when the transmittance parameter is less than a transmittance threshold value, then actuate the PTC shroud by actuating the cooler to an ON state.

According to the at least one example set forth above, the transmittance threshold value comprises a first transmittance threshold value, and further comprising, to: actuate the PTC shroud when the transmittance parameter is less than the first transmittance threshold value, and not actuate the PTC shroud when the transmittance parameter is greater than the first transmittance threshold value.

According to the at least one example set forth above, the instructions further comprise, to: when the transmittance parameter is greater than the first transmittance threshold value and less than a second transmittance threshold value, then actuate at least one of a blower or a jet.

According to the at least one example set forth above, the instructions further comprise, to: use data from the sensor to operate a vehicle in an autonomous mode.

According to the at least one example set forth above, the system further comprises: the sensor, wherein the sensor comprises a cover carrying the PTC shroud and an active cooler electrically coupled to the PTC shroud, wherein, when the cooler is in an ON state, current is provided to the PTC shroud.

According to the at least one example set forth above, the cooler is a thermoelectric cooler.

According to the at least one example set forth above, the sensor comprises a cover, wherein the PTC shroud is located at a periphery of the cover.

According to the at least one example set forth above, the system further comprises: a housing that carries the sensor in a passage thereof; and a blower, wherein, when the blower is in an ON state, the cooler is actuated to the ON state and air heated by the sensor is moved out of the housing.

According to the at least one example set forth above, the housing is mounted to a roof of a vehicle.

According to at least one illustrative example, a method is disclosed that comprises: actuating a positive temperature coefficient (PTC) shroud of a sensor based on a transmittance parameter of the sensor.

According to the at least one method example set forth above, the sensor comprises a cover, wherein the PTC shroud is located at a periphery of the cover.

According to the at least one method example set forth above, the method further comprises: using data from the sensor to operate a vehicle in an autonomous mode.

According to the at least one method example set forth above, the method further comprises: storing a transmittance threshold value in memory, wherein the transmittance threshold value is associated with autonomous vehicle operation; and determining to actuate the PTC shroud when a transmittance parameter is less than the transmittance threshold value.

According to at least one illustrative example, a method is disclosed that comprises: for an image of a sensor comprising a positive temperature coefficient (PTC) shroud, determining a signal-to-noise (SNR) value, a peak SNR (PSNR) value, a root mean square error (RMSE) value, and a mean absolute error (MAE) value; and based on the SNR, PSNR, RMSE, and MAE values, actuating the PTC shroud.

According to the at least one method example set forth above, the method further comprises: comparing the SNR value, the PSNR value, the RMSE value, and the MAE value to a transmittance SNR threshold value, a transmittance PSNR threshold value, a transmittance RMSE threshold value, and a transmittance MAE threshold value, respectively; determining that: the SNR value<the transmittance SNR threshold value, the PSNR value<the transmittance PSNR threshold value, the RMSE value>the transmittance RMSE threshold value, and the MAE value>the transmittance MAE threshold value; and then actuating the PTC shroud.

According to the at least one method example set forth above, the method further comprises: correlating a transmittance parameter to the SNR value, the PSNR value, the RMSE value, and the MAE value; determining that the transmittance parameter is less than a threshold; and then, actuating the PTC shroud.

According to the at least one method example set forth above, the sensor comprises a cover, wherein the PTC shroud is located at a periphery of the cover.

According to the at least one method example set forth above, the method further comprises: using data from the sensor to operate a vehicle in an autonomous mode.

According to the at least one example, a computer is disclosed that is programmed to execute any combination of the examples of the method(s) set forth above.

According to the at least one example, a computer program product is disclosed that includes a computer readable medium that stores instructions executable by a computer processor, wherein the instructions include any combination of the examples of the method(s) set forth above.

Turning now to the figures wherein like reference numerals denote like or similar elements, features or functions, a vehicle 10 is shown that comprises an imaging system 12. The imaging system 12 may comprise a housing 18 having a fluid distribution system 20 and a sensor suite 22 (system 20 and sensor suite 22 shown in FIGS. 2-4 and 7). Sensor suite 22 comprises one or more sensors carried by the housing 18, the sensors arranged to provide the vehicle 10 situational awareness (e.g., for operation in an autonomous mode or the like). For example, the suite 22 may include one or more camera sensors 24 (e.g., hereafter, referred to simply as cameras), one or more radio detection and ranging (radar) sensors 26, one or more light detection and ranging (lidar) sensors 28, and the like). As will be described more below, in at least one example, the distribution system 20 within the housing 18 may include at least one inlet 30 (e.g., two are shown), one or more interior passages 34, 36, 38 in fluid communication with one another, a blower 48 for moving air within the passages 34-38, and at least one outlet 50 (e.g., one for each sensor). In one example, each of the sensors may radiate heat within at least one of the passages 34-38 (heating the air therein), air may be received into the housing 18 via the inlet(s), and the blower 48 may move the heated air through the passages 34-38 and out of the housing 18 via the outlet(s) 50. In at least one example, each sensor comprises a cover 52 and the housing 18 comprises an outlet 50 proximate to each respective cover 52. Accordingly, forced air may be directed out of the housing 18 via the outlet(s) 50 and onto respective covers 52 to remove debris therefrom (as used herein, debris includes dust, dirt, ice, snow, moisture, fog, rain droplets, and the like). In this manner, the covers 52 may be cleaned and concurrently, the fluid distribution system 20 may cool the sensors of suite 22 (e.g., if necessary).

Figure 11:
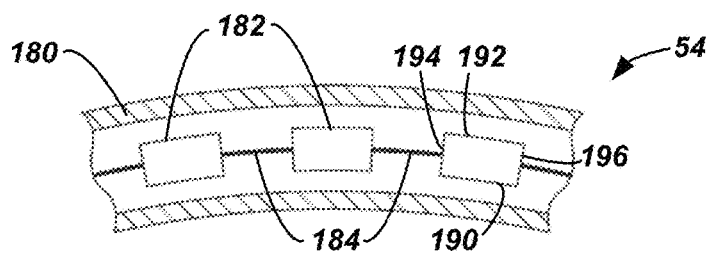
FIG. 11 is an enlarged top view of a portion of the PTC shroud shown in FIG. 10.

According to one example explained more below, at least some of the covers 52 comprise a positive temperature coefficient (PTC) shroud 54 (FIG. 11) located on an outer surface 56 thereof. As used herein, a positive temperature coefficient (PTC) shroud is a shroud comprised of electrically-resistive material adapted to radiate heat, wherein the resistance thereof is directly proportional to temperature, wherein, when the shroud is coupled electrically to a power source and the temperature is less than a predetermined threshold, resistance decreases and heat radiation increases, and wherein, when the shroud is coupled electrically to a power source and the temperature is greater than a predetermined threshold, resistance increases and heat radiation decreases. It should be appreciated that directly proportional to temperature may or may not be linearly proportional; typically, the relationship is not linear. In at least one example, a narrow temperature band (e.g., 10-15) comprises a transition region of the PTC shroud—e.g., wherein, in this region, resistance typically increases six to eight times over this temperature range. As used herein, a shroud is an apparatus that is coupled to a cover, window, optic, lens, or other like component of an electronic sensor so that, when actuated electrically, it may heat the respective sensor component.

As explained more below, each PTC shroud 54 may be coupled electrically to an active cooler 58 of the respective sensor (FIG. 8); e.g., wherein the cooler 58 serves to move heat away from the sensor. According to one example shown in FIGS. 2-6, each of the illustrated cameras 24 comprise a shroud 54 on the respective outer surfaces 56 of the covers 52. As described more below, for at least some of the sensors of system 12, a first computer 60 of the imaging system 12 may control a thermal circuit 62 (that includes the blower 48, the respective active coolers 58, and the corresponding PTC shrouds 54). According to one electrical arrangement, when the blower 48 is actuated to an ON state, each respective active cooler 58 is actuated to an ON state and current is passed through the corresponding PTC shroud 54. Thus, when the temperature at the PTC shroud(s) 54 are less than a predetermined threshold, the shroud(s) 54 warm the cover(s) 52, and warm forced air is expelled across the cover 52. This illustrative operation may be suitable for removing ice or melting snow from the cover 52 and thereby improving imaging capability of the sensor. Alternatively, when the temperature at the PTC shroud(s) 54 is greater than or equal to the predetermined threshold, forced air still may be expelled across the cover 52, however, resistivity of the shroud(s) 54 increase thereby minimizing the amount of heat radiated therefrom. This illustrative operation may be more suitable for removing dust and dirt from the cover 52 (e.g., again to improve imaging capability) than for melting ice and snow, as the threshold temperature may be too high for ice/snow. As discussed more below, use of the PTC shroud(s) 54 can minimize the need for direct electrical control of a heating element for the cover, window, optic, lens, or other like sensor component, as the PTC shroud(s) 54 may be self-regulating with respect to temperature control. And in one example, coupling the PTC shroud(s) 54 with other electrical components (e.g., the blower 48 and active coolers 58) may improve cleaning of the imaging system 12.

As will further be explained below, the imaging system 12 may comprise a second computer 64 which may be programmed to control autonomous driving of vehicle 10. In addition, second computer 64 further may be programmed to receive sensor data from the various sensors 24, 26, 28, analyze the sensor data, and using the sensor data, actuate the PTC shroud(s) 54 based on a transmittance parameter of one or more of the respective sensors being less than a transmittance threshold value. More particularly, by controlling first computer 60, the second computer 64 indirectly may control whether to actuate the blower 48, selectively actuate the active coolers 58, and accordingly selectively actuate the respective PTC shrouds 54. Following an illustrative description of the vehicle 10 and imaging system 12, a computer-implemented process executable by first and/or second computers 60, 64 will be described.

FIG. 1 illustrates vehicle 10 as a passenger vehicle; however, vehicle 10 could be any other suitable vehicle type, including a truck, a sports utility vehicle (SUV), a recreational vehicle, a bus, aircraft, marine vessel, or the like that comprises the imaging system 12. In at least one example, the imaging system 12 is adapted to facilitate operation of vehicle 10 in one or more autonomous modes, as defined by the Society of Automotive Engineers (SAE) (which has defined operation at levels 0-5). For example, imaging system 12 may provide two- and/or three-dimensional data of its surroundings to the second computer 64 which further may be programmed and/or configured to store and execute logic instructions embodied in hardware, software, firmware, a combination thereof, or the like, and to enable vehicle 10 to operate with some user assistance (partial autonomy) or without any user assistance (full autonomy). For example, at levels 0-2, a human driver monitors or controls the majority of the driving tasks, often with no help from the vehicle 10. For example, at level 0 ("no automation"), a human driver is responsible for all vehicle operations. At level 1 ("driver assistance"), vehicle 10 sometimes assists with steering, acceleration, or braking, but the driver is still responsible for the vast majority of the vehicle control. At level 2 ("partial automation"), vehicle 10 can control steering, acceleration, and braking under certain circumstances without human interaction. At levels 3-5, vehicle 10 assumes more driving-related tasks. At level 3 ("conditional automation"), vehicle 10 can handle steering, acceleration, and braking under certain circumstances, as well as monitoring of the driving environment. Level 3 may require the driver to intervene occasionally, however. At level 4 ("high automation"), vehicle 10 can handle the same tasks as at level 3 but without relying on the driver to intervene in certain driving modes. At level 5 ("full automation"), vehicle 10 can handle all tasks without any driver intervention.

Housing 18 may be carried by vehicle 10 on a roof 68 thereof or at any other suitable location. The illustrated housing 18 may comprise any suitable structure to support the sensor suite 22 and blower 48. In general, it may have a shell 70 which comprises a base 72 and a tower 74. In at least one example, the base 72 comprises two inlets 30 (to one or more first passages 34) which face vehicle-forwardly (FIG. 3), and the base couples the housing 18 to the vehicle 10. In this manner, when the vehicle 10 is being operated in DRIVE (forwardly), the inlets 30 may receive air into the first passage(s) 34; e.g., also into the base 72 (see FIG. 4).

The tower 74 may extend upwardly from the base 72 and may be generally cylindrical in shape; however, this is not required. A lower portion 76 of the tower 74 may enclose the blower 48 and at least one second passage 36 within which the blower 48 may be mounted. Passage(s) 34 and 36 may be in fluid communication with one another (e.g., via an opening 77).

Figure 3:
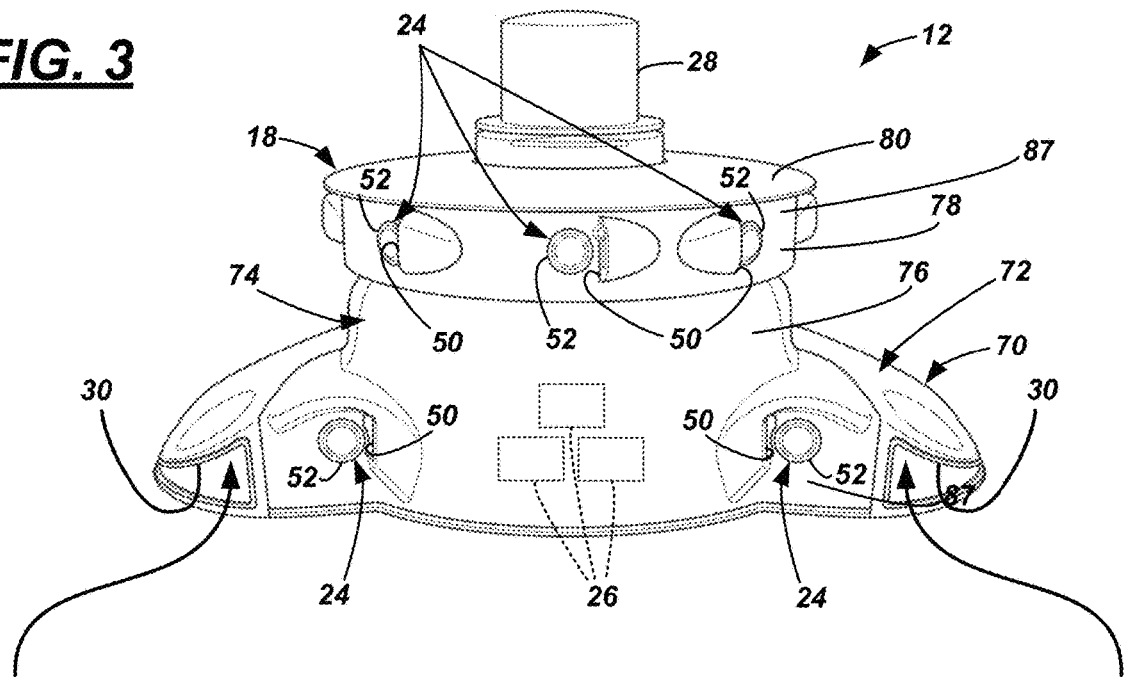
FIG. 3 is a perspective front view of the housing of the imaging system.

In one example, lower portion 76 may carry the radar sensors 26 (e.g., facing vehicle-forwardly as shown in FIG. 3, or in any other suitable arrangement). Radar sensors 26 may be in at least partial fluid communication with second passage(s) 36; so that excess heat radiated from sensors 26 may be moved out of the housing 18.

Figure 4:
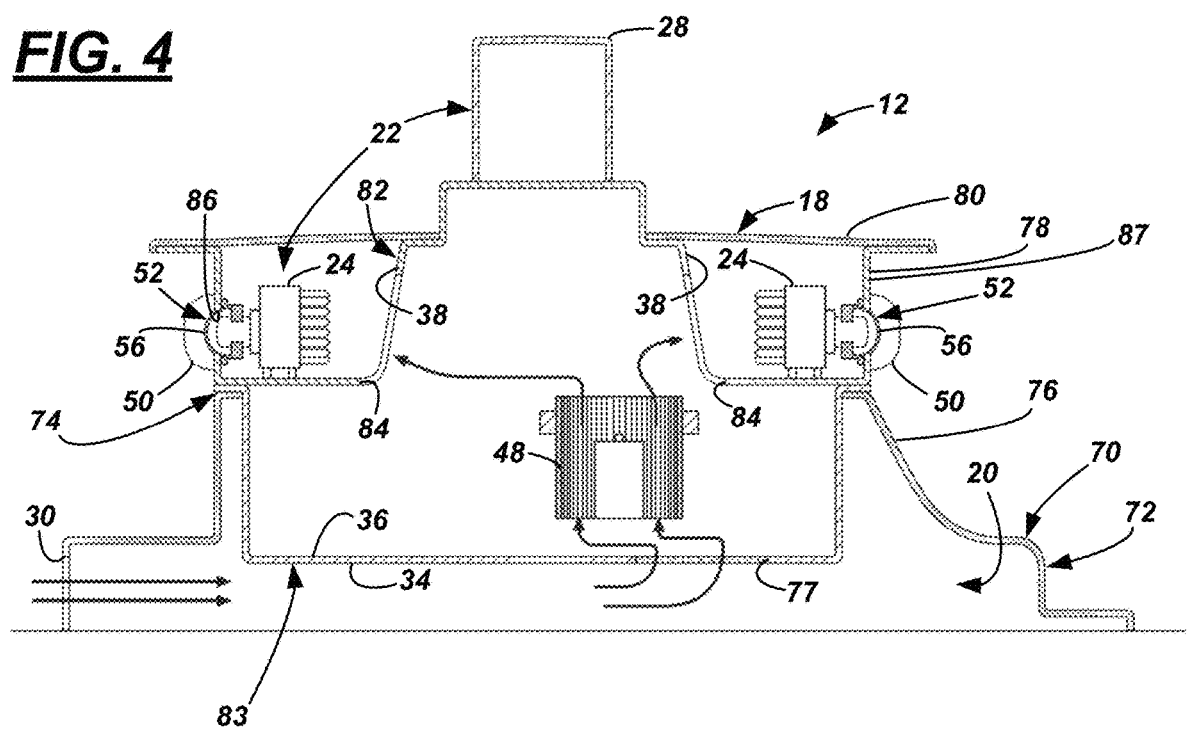
FIG. 4 is a sectional side view of the housing.

An annular portion 78 may be coupled to and may extend upwardly from the lower portion 76, may comprise at least one third passage 38, may be adapted to carry an array of cameras 24 within the at least one third passage 38, and may be adapted to carry the lidar sensor 28 on a lid 80 of the annular portion 78. As best shown in FIG. 4, second passage 36 may comprise a knurled portion 82 extending upwardly from a basin portion 83 of the same—e.g., and the knurled portion 82 may comprise an arrangement of circumferentially-spaced openings 84 (see FIG. 5). Third passage 38 may extend annularly around the knurled portion 82 and may be in fluid communication with second passage 36—at least via the openings 84. In at least one example, the circumferential location of each opening 84 may correspond with a mounting position of a camera 24. For example, the circumferentially-spaced cameras 24 (each facing radially outwardly) may be mounted to exterior openings 86 on a circumferential wall 87 of the annular portion 78 and may be positioned at least partially within the third passage 38 (e.g., to protect the cameras from the environment).

The knurled portion 82 may have an opening 88—at an upper edge 90—to second passage 36. Edge 90 may correspond with a shape and size of a base of lidar sensor 28—e.g., wherein the base of the lidar sensor 28 comprises a passive or active heat exchanger. In this manner, any excess heat radiated by lidar sensor 28 into second passage 36 via opening 88 may be expelled from the housing 18 (e.g., via blower 48).

Figure 5:
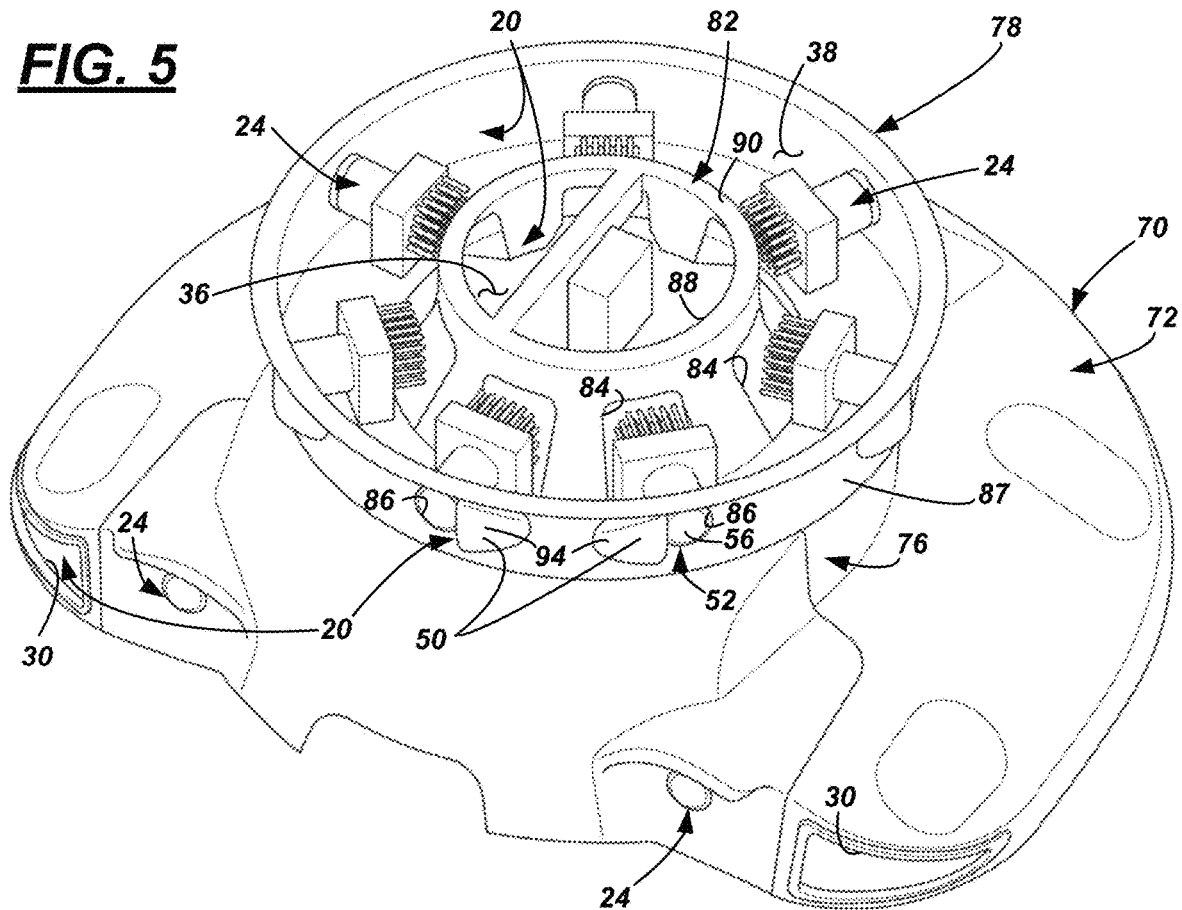
FIG. 5 is a perspective cut-away view of the housing, revealing an annular passage comprising a plurality of camera sensors of the sensor suite.

The annular portion 78 may comprise a plurality of outlets 50 in wall 87, as best shown in FIGS. 3-5. Each outlet 50 may be identical; therefore, only one will be described. According to at least one example (see FIG. 6), each outlet 50 may comprise a hole 92 that extends through wall 87 and which is proximate to an exterior opening 86 (and accordingly proximate to a camera 24). Each outlet 50 also may comprise a hood 94 (FIGS. 5-6) to direct forced air which exits the hole 92 transversely with respect to the exterior opening 86 (e.g., and thus transversely with respect to the outer surface 56 of the cover 52 of the respective camera 24).

Other outlets may exist on housing 18 as well. For example, a circumferential outlet (not shown) may be positioned to exhaust air upwardly around lidar sensor 28, one more outlets can be positioned relative to radar sensors 26, or the like.

Housing 18 may carry sensors other than those discussed above (e.g., other than cameras 24, radar sensors 26, and lidar sensor(s) 28). Further, in one example, the sensors may be located in other regions of housing 18. For example, as shown best in FIGS. 3 and 5, two cameras 24 may be located in base 72—e.g., forward-facing (e.g., and in fluid communication with passage 34—not shown).

In addition, the illustrated housing 18 is merely an example. In other examples, housing 18 may comprise more or fewer inlets 30, more or fewer outlets 50 (see FIGS. 3-5), more or fewer passages 34-38, more or fewer cameras 24, more or fewer radar sensors 26, more or fewer lidar sensors 28, passages having different shapes, inlets 30 and/or outlets 50 having different shapes, different arrangements for carrying cameras 24, radar sensors 26, and/or lidar sensor(s) 28, or the like. For instance, in at least one example, the cameras 24 are not arranged in a radial fashion and in some examples, the tower 74 may not comprise annular portion 78.

Figure 6:
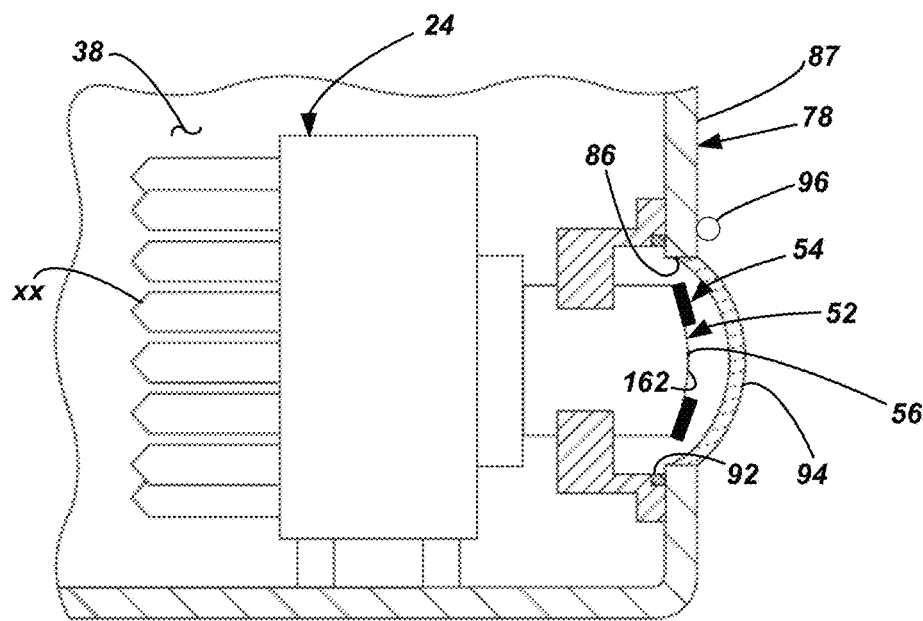
FIG. 6 is a sectional side view of a camera sensor within the housing.
Figure 7:
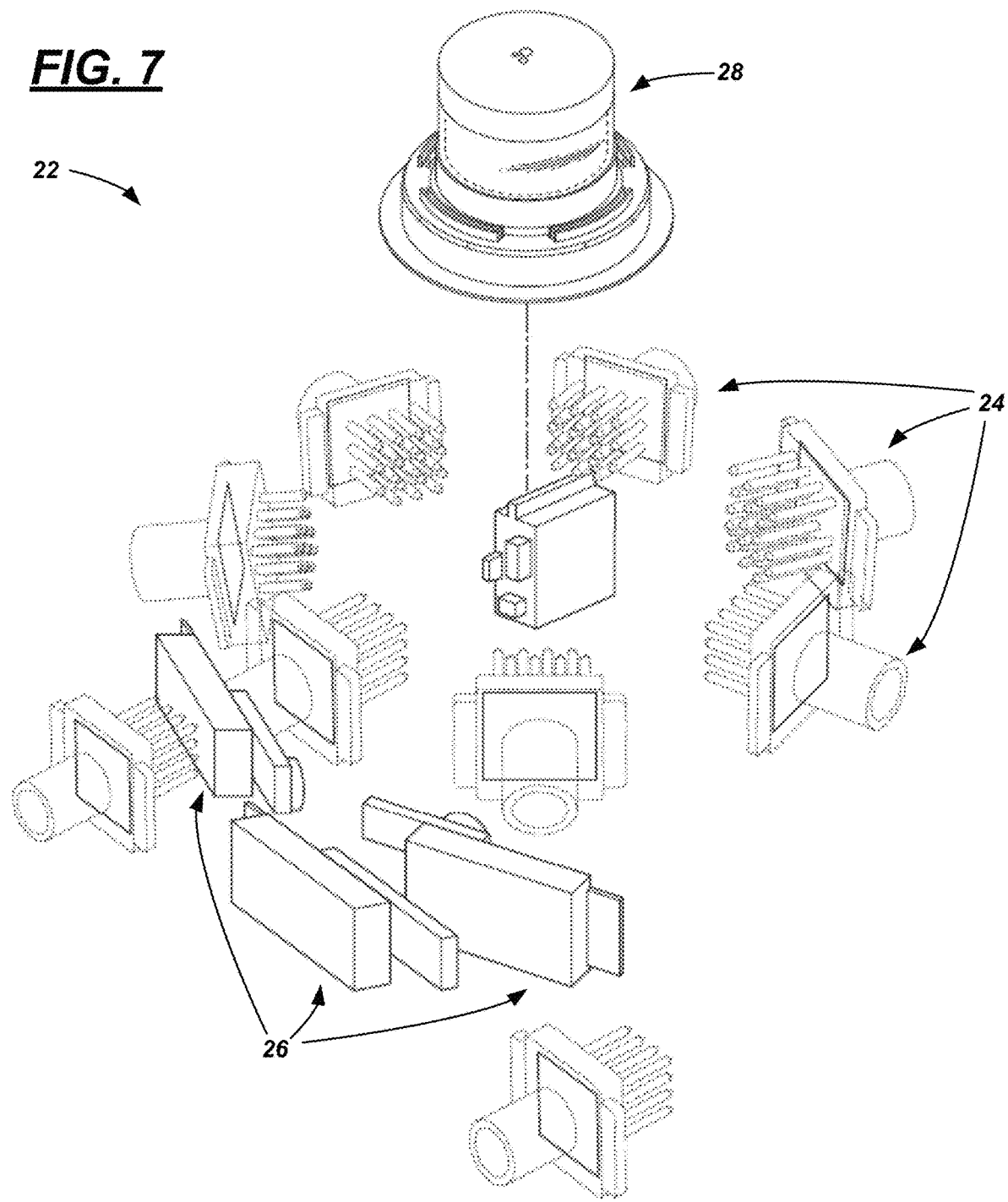
FIG. 7 is a perspective view of the imaging system, wherein exemplary elements other than the sensor suite are hidden.

In at least additional one example, the housing 18 comprises a plurality of jets (one is shown in FIG. 6 (jet 96) for illustrative purposes) for spraying a liquid onto the cameras 24, radar sensor(s) 26, and/or lidar sensor(s) 28. In one example, jet(s) 96 may be positioned relative to each of the outlets 50. The housing further may comprise a fluid reservoir and a pump therein (neither is shown), the pump configured to move a liquid within the reservoir (such as water or a cleaning solution) from the reservoir and onto the cover(s) 52 or other suitable sensor surfaces. In one example, each jet 96 may be selectively actuatable (e.g., by first computer 60). Thus, as explained more below, computer 60 may execute a variety of cleaning tasks. As used herein, a cleaning task is one or more of the following: spraying a liquid at a sensor (or cover thereof), directing forced air thereat, or heating a lens or cover of the sensor via a PTC shroud.

Figure 8:
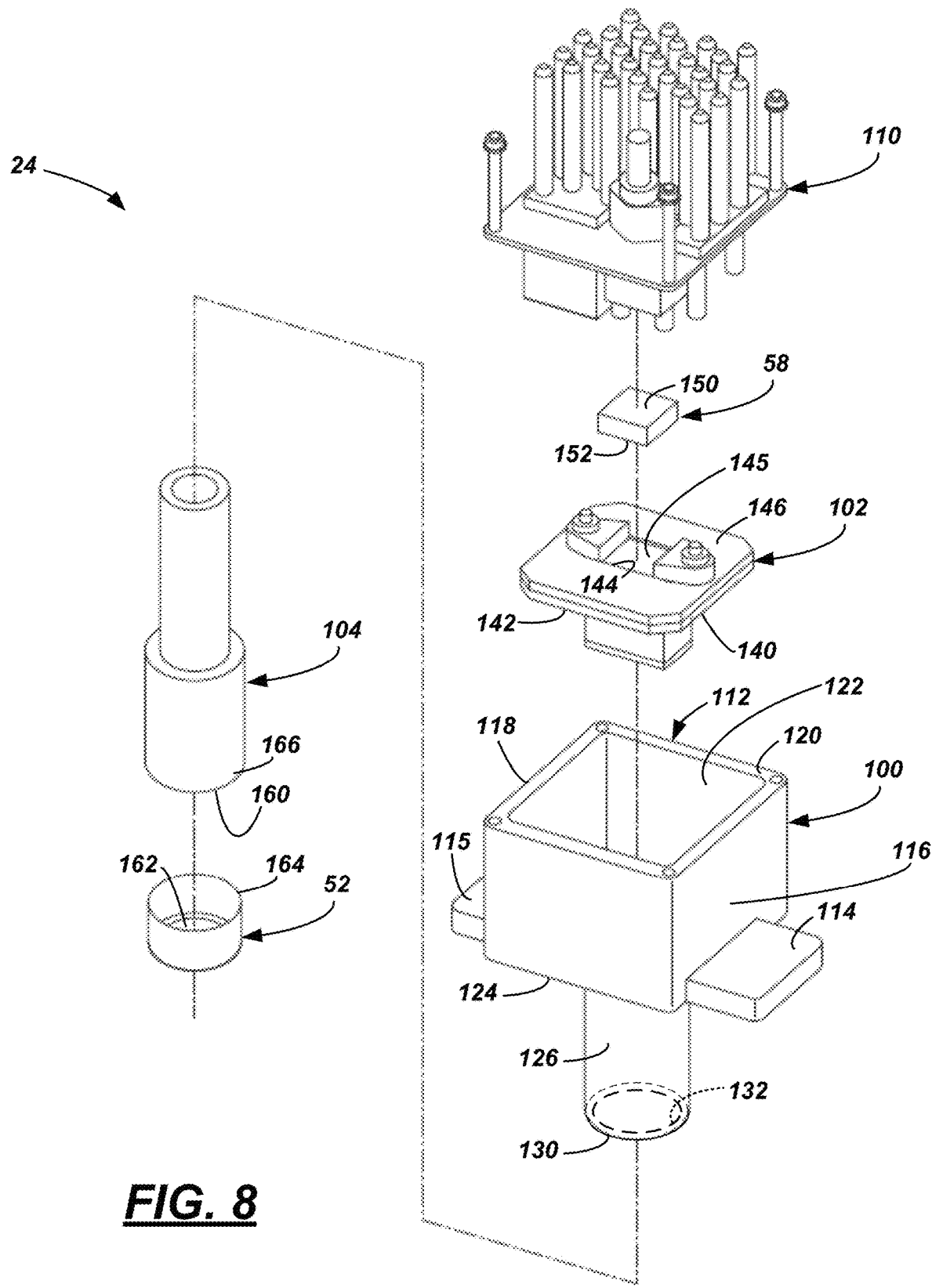
FIG. 8 is an exploded perspective view of a camera sensor, the camera sensor comprising a housing, a detector assembly, a lens cover having a positive temperature coefficient (PTC) shroud, an active cooler, and a heat exchanger.

Turning now to the cameras 24, in at least one example, each camera 24 may be identical; therefore, only one will be described in detail. Camera 24 is an electronic device that electrically communicates image data to a computer (e.g., sending second computer 64 images, video, etc.). FIG. 8 illustrates an exploded view of an illustrative camera 24 that comprises a housing 100, a detector assembly 102, a lens 104, the cover 52 for lens 104, the active cooler 58, and a heat exchanger 110.

According to one example, housing 100 has a hollow body 112 that comprises a pair of mounting flanges 114, 115, each extending from a respective side 116, 118 of the body 112 (e.g., the flanges 114 adapted to mount camera 24 to the circumferential wall 87 of housing 18). A first end 120 of the body 112 may have an opening to a cavity 122 that is sized to receive the detector assembly 102. From a second end 124 of body 112, a conduit 126 axially may extend to and terminate at a distal end 130. End 130 also may comprise an opening 132 sized to receive the lens 104.

Detector assembly 102 may comprise a detector 140 (e.g., also called an electronic imager), e.g., typically an array of photosensitive pixels. Assembly 102 may comprise other elements as well—e.g., such as a printed circuit board (PCB), mounting features and hardware, a gasket, a thermal pad, and/or any other suitable component. Detector 140 may be located on one side 142 of the assembly 102, and a recess 144, comprising a major surface 145 (e.g., at the bottom of the recess 144), may be located on an opposite side 146 thereof.

Figure 9:
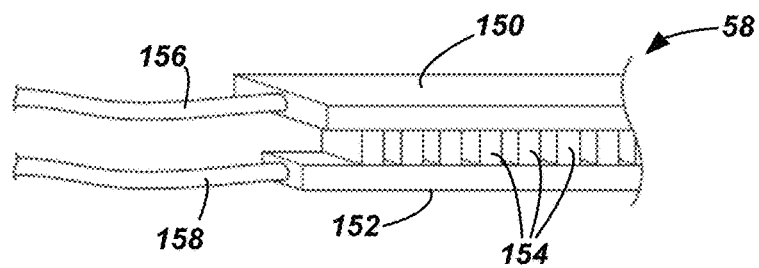
FIG. 9 is a perspective view of the TEC shown in FIG. 8.

The recess 144 may be sized to receive the active cooler 58. As used herein, an active cooler is any electronically-actuated heat transfer device. As shown in FIG. 9, active cooler 58 may comprise a hot plate 150, a cold plate 152, a plurality of conductors 154 coupling the plates 150, 152 to one another, and two connections 156, 158. One non-limiting example of active cooler 58 is a thermoelectric cooler (TEC) (also called a Peltier device, a Peltier heat pump, or a solid-state refrigerator) which utilizes the Peltier effect to create a heat flux between the hot and cold plates 150, 152. In one example, conductors 154 comprise thermoelectric materials (e.g., p-type conductors and n-type conductors). Connection 156 may be connected to the hot plate 150, and connection 158 may be connected to the cold plate 152. In operation, current flows through connection 156, through the hot plate 150, through the conductors 154, through the cold plate 152, and through connection 158. When current is flowing, heat moves from the cold plate 152 to the hot plate 150. Thus, in order to actively cool the detector 140, the cold plate 152 may be adjacent the major surface 145 (e.g., nearest detector 140).

The heat exchanger 110 may be thermally coupled to the hot plate 150 of the active cooler 58. In this manner, heat may be transferred from the cooler 58 to the heat exchanger 110, and ultimately dissipated into the air of third passage 38 (and thereafter evacuated using blower 48). The heat exchanger 110 may be a passive device—e.g., such as a heat sink having fins, blades, protrusions, etc. to dissipate heat more efficiently. Other passive and even active heat exchangers are contemplated.

Lens 104 may comprise one or more transparent elements (not shown) for magnifying, concentrating and/or dispersing light rays. Lens 104 may represent multiple lenses of any suitable configuration and any suitable materials (e.g., glass, acrylic, etc.). Lens 104 may comprise a distal surface 160—i.e., the surface upon which light entering the lens first impinges.

As used herein, a cover 52 comprises a transparent portion 162 (i.e., one of a transparent optic, a transparent film, or both). As used herein, an optic is an optical component (e.g., such as a lens, a flat or curved window, a prism, or the like). In at least one example, the cover comprises the outwardly-facing surface 56 and is adapted to protect the distal surface 160 from scratches, damage, etc. In the illustrated example, cover 52 comprises an annular band 164 coupled to and carrying the transparent portion 162 (e.g., a transparent window)—e.g., the band 164 being sized to attach cover an end 166 of the lens 104. For example, it is arranged to be located between the lens 104 of the sensor 24 and the environment outside of the housing 18. The transparent portion 162 may comprise any suitable transparent material and have a shape configured to minimize aberrations, distortion, diffusion, etc. In other examples, the transparent portion 162 may be a film applied to an optic of the sensor itself (e.g., applied directly to surface 160). And in at least one example, the cover 52 is not a separate component as shown in FIG. 8—e.g., it may be integrated with lens 104.

Figure 10:
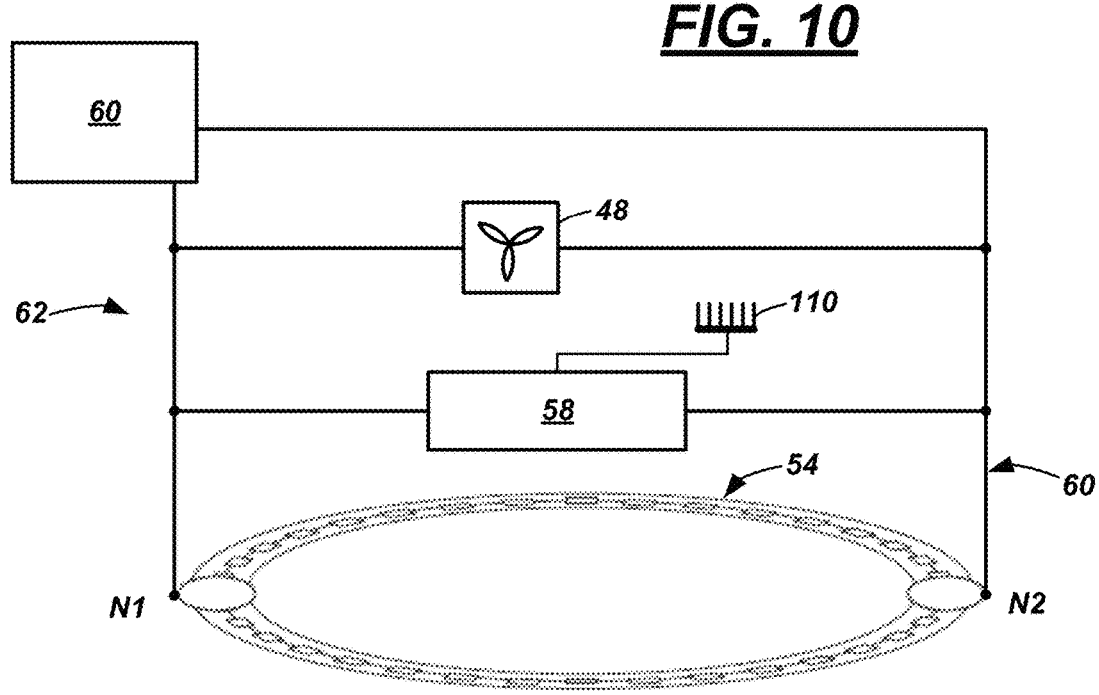
FIG. 10 is an exploded perspective view of the lens and PTC shroud and a partial schematic view of a thermal circuit.

FIG. 10 illustrates the cover 52 (e.g., annular band 164 is hidden). As discussed above, cover 52 may comprise the positive temperature coefficient (PTC) shroud 54 located on the transparent window 162. In at least some examples, the PTC shroud 54 may be adhered to, bonded, glued, or otherwise attached to surface 56. For example, as described more below, the PTC shroud 54 may be inked thereon.

According to one example (FIGS. 10-11), PTC shroud 54 comprises a substrate 180, a plurality of daisy-chained PTC elements 182, and a plurality of traces 184 that interconnects the daisy-chained PTC elements 182 in series. According to one example, the substrate 180 is a film having an adhesive on one side for bonding to surface 56 of cover 52 (of course, the substrate 180 may be applied to other suitable surfaces of the sensor as well). The substrate 180 is optional; and e.g., in at least example, it is omitted. For instance, in this latter case, the PTC elements 182 may be inked onto the outer surface 56 itself (e.g., at a manufacturing facility).

Thus, the PTC elements 182 may be printed on the substrate 180, or as described above, may be printed directed on the cover 52. In the illustrated example, the PTC elements 182 are thin rectangular sheets having an inboard side 190, an outboard side 192, a first end 194, and a second end 196. Of course, the rectangular shape is merely an example; other shapes are also possible.

Commercially-available implementations of the PTC elements 182 include variants of the Loctite™ ECI 8000 E&C Series. For example, Loctite™ ECI 8045 E&C, Loctite™ ECI 8001 E&C, Loctite™ ECI 8080 E&C, and Loctite™

ECI 8120 E&C are screen-printable inks which have resistances of 1200-1700 $\Omega/\text{sq}@25$ µm (at a 45° C. threshold), 1500-2000 $\Omega/\text{sq}@25$ µm (at a 65° C. threshold), 1500-2000 $\Omega/\text{sq}@25$ µm (at a 80° C. threshold), and 1500-2000 $\Omega/\text{sq}@25$ µm (at a 120° C. threshold), respectively.

Using one commercially-available product as an example, when PTC elements 182 comprised of Loctite™ ECI 8045 E&C reach the 45° C. threshold, the resistance may increase 6-8 times (e.g., from 242$\Omega$ to 1700$\Omega$). The other listed variants respectively may increase 6-8 times at the thresholds 65° C., at 80° C., and 120° C.

The traces 184 may be comprised of any suitable conductive material. In at least one example, the traces 184 comprise a metal (e.g., silver, copper, or the like). Each trace 184 may extend from the first end 194 of a PTC element 182 to the second end 196 of an adjacently-located PTC element 182. Thus, PTC elements 182 and the interstitially-located traces 184, collectively, may define a circuit loop. For example, a first PTC element 182 may be coupled to a node N1 and a last PTC element 182 may be coupled to a node N2, wherein the remaining PTC elements 182 may be daisy-chained in series therebetween. Thus, when current enters node N1 it may pass through each PTC element 182 in series and then exit the PTC shroud 54 via the last node N2.

The PTC shroud 54 may be located in a periphery 198 of the cover 52 so that the majority of the cover 52 is unobstructed and the sensor's field-of-view (FOV) is minimally, if at all, diminished. According to one example, the periphery 198 is less than 5% of a surface area of outwardly-facing surface 56.

Radar sensors 26 may be any suitable electronic device that emits a radio signal, receives a reflection of that signal off an object outside the vehicle 10, and provides range data to the second computer 64—e.g., so that the computer 64 can navigate the vehicle 10. While not shown, radar sensors 26 may comprise active and/or passive coolers which ultimately radiate heat into one or more of the passages 34-38. Further, in some examples, one or more of the radar sensors 26 may comprise a PTC shroud.

Lidar sensors 28 may be any suitable electronic device that emits visible or non-visible light signals, receives a reflection of the light signal off an object outside the vehicle 10, and provides range data to the second computer 64. This data also may enable the computer to navigate the vehicle 10 and/or be used for other purposes Like the radar sensors 26, sensor(s) 28 may comprise active and/or passive coolers which ultimately radiate heat into one or more of the passages 34-38 (e.g., such as passage 36, as shown in FIG. 5). Further, in some examples, one or more of the lidar sensors 28 may comprise a PTC shroud.

Turning now to blower 48, as used herein, a blower is any mechanical device adapted to move air. Non-limiting examples of blower 48 include an axial-flow fan, a centrifugal fan, a cross-flow fan, a positive displacement pump, a reciprocating pump, or the like. In at least one example, the blower 48 is powered by electricity—e.g., so that first computer 60 may actuate it between an ON state and an OFF state.

Turning now to first computer 60 and second computer 64 (FIGS. 2, 12), these computers are hardware devices which comprise one or more processors and any suitable computer memory. Non-limiting examples of processors include microprocessors, microcontrollers or controllers, application specific integrated circuits (ASICs), and field-programmable gate arrays (FPGAs), just to name a few. Non-limiting examples of memory include conventional hard disks, solid-state memory, random-access memory (RAM), read-only memory (ROM), erasable programmable read-only memory (EPROM), and electrically erasable programmable read-only memory (EEPROM), just to name a few. The processor(s) may be programmed to process and/or execute digital instructions stored in memory. These instructions may be embodied as any suitable type of computer code, software programming, firmware programming, or the like.

According to one non-limiting example, the first computer 60 is a cleaning control module (CCM) or a body control module (BCM) (having a processor 200 and memory 210) and the second computer 64 is an autonomous driving computer (ADC) (having a processor 220 and memory 230). These are merely examples; and other examples exist.

Among other things, the ADC 64 may be responsible for powering and/or operating of the imaging system 12—e.g., controlling whether the cameras 24, the radar sensors 26, and/or lidar sensor(s) 28 are in an ON state or OFF state, and also determining whether to actuate the PTC shroud(s) 54 based on a transmittance calculation using data from at least one sensor 24, 26, 28. CCM 60 may control the thermal circuit 62, and in some instances do so in response to a command from ADC 64. Thus, for example, CCM 60 may selectively control actuation of the blower 48, the active coolers 58, and/or the PTC shrouds 54. While not required, in at least one example, the CCM 60 independently can control the blower 48 and any of the cameras 24. Selective control may be facilitated using a multiplexor 240 or any other suitable selection circuit or control algorithm. Further, while not required, in at least one example, the CCM 60 can actuate the blower 48 from an OFF state to an ON state, and without additional control signals or instructions, actuate the active cooler(s) 58 and corresponding PTC shroud(s) 54 from the OFF state to an ON state. For example, as illustrated conceptually in FIG. 10, CCM 60 may control power to the blower 48 and consequently control power to each active cooler 58 (e.g., coupled in parallel). Internal to each camera 24, the corresponding PTC shroud 54 may be coupled in parallel with the active cooler 58 so that when the cooler 58 is actuated to an ON state, current is delivered to the PTC shroud 54 (and conversely, when the cooler 58 is actuated to an OFF state, power is terminated to the corresponding PTC shroud 54). In addition, in at least one example, CCM 60 may control the jets 96 directing fluid at the cover(s) 52 of the cameras 24 and/or other sensors 26, 28.

The processor(s) 220 of ADC 64 may control steering, acceleration, and braking of vehicle 10. Such autonomous operation may comprise processor(s) 220 receiving sensory data from the sensor suite 22 of the imaging system 12. According to one example, the ADC 64 may be programmed to: for at least some of the sensors 24-28, calculate a transmittance parameter for the respective sensor (e.g., which may be less than optimal based on debris at the cover 52); and based on a value of the transmittance parameter, control a cleaning task at the respective sensor (e.g., actuate the PTC shroud 54, spray liquid, and/or blow air). Further, in at least one other example, ADC 64 may be programmed to, for at least one sensor: calculate a transmittance parameter; determine whether the transmittance parameter is less than a threshold; and when the transmittance is less than the threshold, actuate the sensor's corresponding PTC shroud 54. To accomplish this, ADC 64 may command CCM 60 to actuate the PTC shroud 54 (e.g., ADC 64 may be programmed to command the CCM 60—e.g., via a network connection 250 to actuate one or more of the blower 48, the active coolers 58, and/or the PTC shrouds 54). In other instances, ADC 64 could actuate the blower 48, the active cooler(s) 58, and/or the PTC shroud(s) 54. In at least one example, CCM 60 and ADC 64 comprise a common computing device (e.g., a computing system). Thus, as used herein, the term 'computing system' means a computer having at least one processor and memory storing instructions to both: control actuation of the PTC shroud(s) 54, calculate the transmittance parameter, and determine whether the transmittance parameter is less than a threshold.

Network connection 250 may include one or more of a controller area network (CAN) bus, Ethernet, Local Interconnect Network (LIN), a fiber optic connection, or the like—just to name a few non-limiting examples. According to one example, which may be used alternatively or in combination with a bus example, connection 250 comprises one or more discrete wired or wireless connections. For example, CCM 60 and ADC 64 may communicate via a CAN bus, sensors 24-28 may communicate image and/or range data to ADC 64 via discrete connections, and CCM 60 controls sensors 24-28 via LIN.

Figure 12:
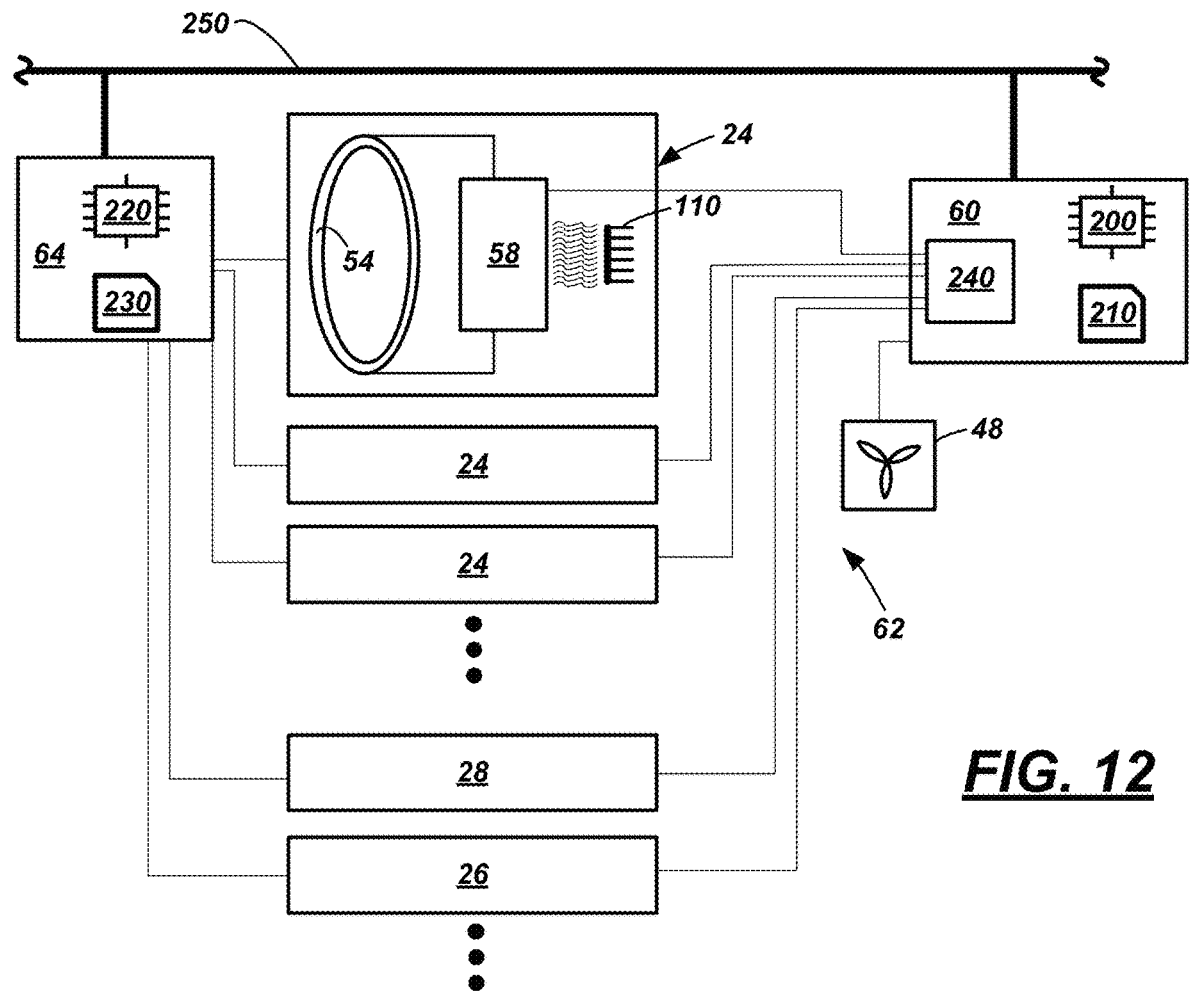
FIG. 12 is a schematic view of one example of a thermal circuit.

It should be appreciated that the thermal circuit 62 shown in FIG. 10 and the thermal circuit 62 shown in FIG. 12 are schematic in nature. Each of the schematic illustrations are merely examples which illustrate functionality of the thermal circuit 62 and which may be implemented exclusive of one another or which may be combined with one another in any suitable fashion.

In operation, ADC 64 may receive image and/or range data (e.g., hereafter, referred to as sensor data) from the sensors 24-28. While this sensor data is received, the CCM 60 may control operation of the thermal circuit 62. In one example, the ADC 64 may determine at least one transmittance parameter and compare that parameter to a threshold, wherein the transmittance parameter is attributable to debris on the respective covers 52 of one or more sensors 24, 26, 28. Based on this determination, ADC 64 may instruct the CCM 60 (via network connection 250) to operate the thermal circuit 62. In another example, the CCM 60 independently may determine to actuate thermal circuit 62—e.g., based on temperature data within housing 18 or the like (e.g., collected from temperature sensors or the like (not shown)). In either instance, CCM 60 may actuate the blower 48 from an OFF state to an ON state. In at least one example, when the CCM 60 actuates the blower 48 to the ON state, the active coolers 58 of the thermal circuit 62 also are actuated. When the coolers 58 are actuated, they may move heat away from the respective detectors 140—e.g., from the cold plate 152 to the hot plate 150 (e.g., via the conductors 154). Thereafter, the thermal coupling of the hot plate 150 and the heat exchanger 110 may deliver heat into one of the passages 34-38 and the blower 48 may exhaust the heated air from the housing 18. As described above, this heated air may be directed across the covers 52 of the respective sensors 24, 26, and/or 28.

In at least one example, when the active coolers 58 are actuated to the ON state, current also may flow through the corresponding PTC shrouds 54. With respect to any individual PTC shroud 54, when the temperature at the PTC shroud 54 is less than a predetermined threshold, resistivity of the PTC elements 182 may be relatively low and—at a predetermined vehicle voltage (e.g., 12 Volts)—the current through the PTC elements 182 may be relatively high causing the PTC elements 182 to radiate a relatively larger amount of heat. According to one example, the thermal properties of the PTC elements 182 may facilitate heating of the PTC shroud 54 to 90° C. in as little as 10 seconds. Conversely, with respect to any individual PTC shroud 54, when the temperature at the PTC shroud 54 is greater than a predetermined threshold, resistivity of the PTC elements 182 may be relatively high and—at a predetermined vehicle voltage (e.g., 12 Volts)—the current through the PTC elements 182 may be relatively low causing the PTC elements 182 to radiate a relatively smaller (perhaps negligible) amount of heat.

Accordingly, when the environment of vehicle 10 is below freezing, the thermal circuit 62 may facilitate melting of snow or ice on the covers 52—e.g., based on the heating of the PTC shroud 54 and/or the warm air being exhausted from the outlets 50—resulting in improved sensor data quality as the covers 52 are cleared of ice, snow, sleet, and moisture that resulted from the PTC shroud heat (or warm air) melting ice or snow thereon. Similarly, when the environment of vehicle 10 is relatively hot, the thermal circuit 62 may facilitate clearing of any debris from the covers 52 while concurrently not causing additional heat from the PTC shroud 54 to heat the respective sensor 24. For example, the active coolers 58 may move heat away from the respective detectors 140 and the blower 48 may force air across the respective covers 52 to clear debris, but the covers 52 are not heated due to the temperature-sensitive properties of the PTC elements 182. Similarly, this may result in improved image data quality as the covers 52 are cleared of debris.

Other examples of the illustrative imaging system 12 exist as well. For example, the blower 48 and one or more of the active coolers 58 need not be electrically coupled in parallel (as shown in FIG. 10). In at least one example, CCM 60 may control the blower 48 independently of the sensors 24, e.g., as shown in FIG. 12.

According to at least one example, the cover 52 comprises the distal surface 160—e.g., surface 160 may be resistant to scratches and other damage. Thus, in at least one example, the PTC shroud 54 may be located on the distal surface 160 instead.

In another example, outwardly-facing surface 56 (of cover 52) or distal surface 160 further comprises a hydrophobic film 300 adhered thereto. And the temperature control characteristics of the PTC shroud 54 avoid heating the cover 52 (or lens 104) when otherwise doing so would damage (e.g., burn, melt, etc.) the hydrophobic film 300.

Figure 13:
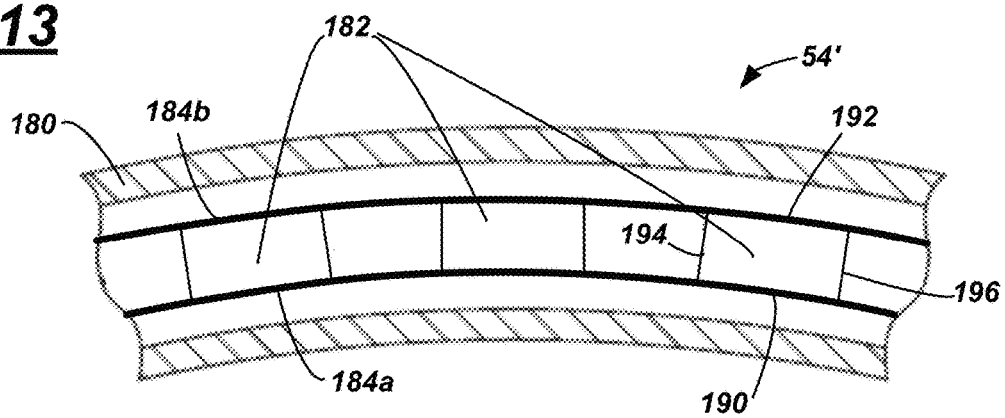
FIG. 13 is a top view of a portion of another example of a PTC shroud.

Other implementations of the PTC shroud also exist. For example, FIG. 13 illustrates a PTC shroud 54' that comprises a pair of parallel traces: an inboard trace 184a and an outboard trace 184b (e.g., trace 184b being concentric with trace 184a). In this implementation, node N1 may be coupled electrically to inboard trace 184a and node N2 may be coupled electrically to outboard trace 184b—e.g., so that current flows from the across the PTC element 182 (from inboard side 190 to outboard side 192, or vice-versa), instead of first end 194 to second end 196 (or vice-versa). By using two parallel traces 184a, 184b, a failure of any one of the PTC elements 182 does not result in a total failure of the PTC shroud 54'.

Figure 14:
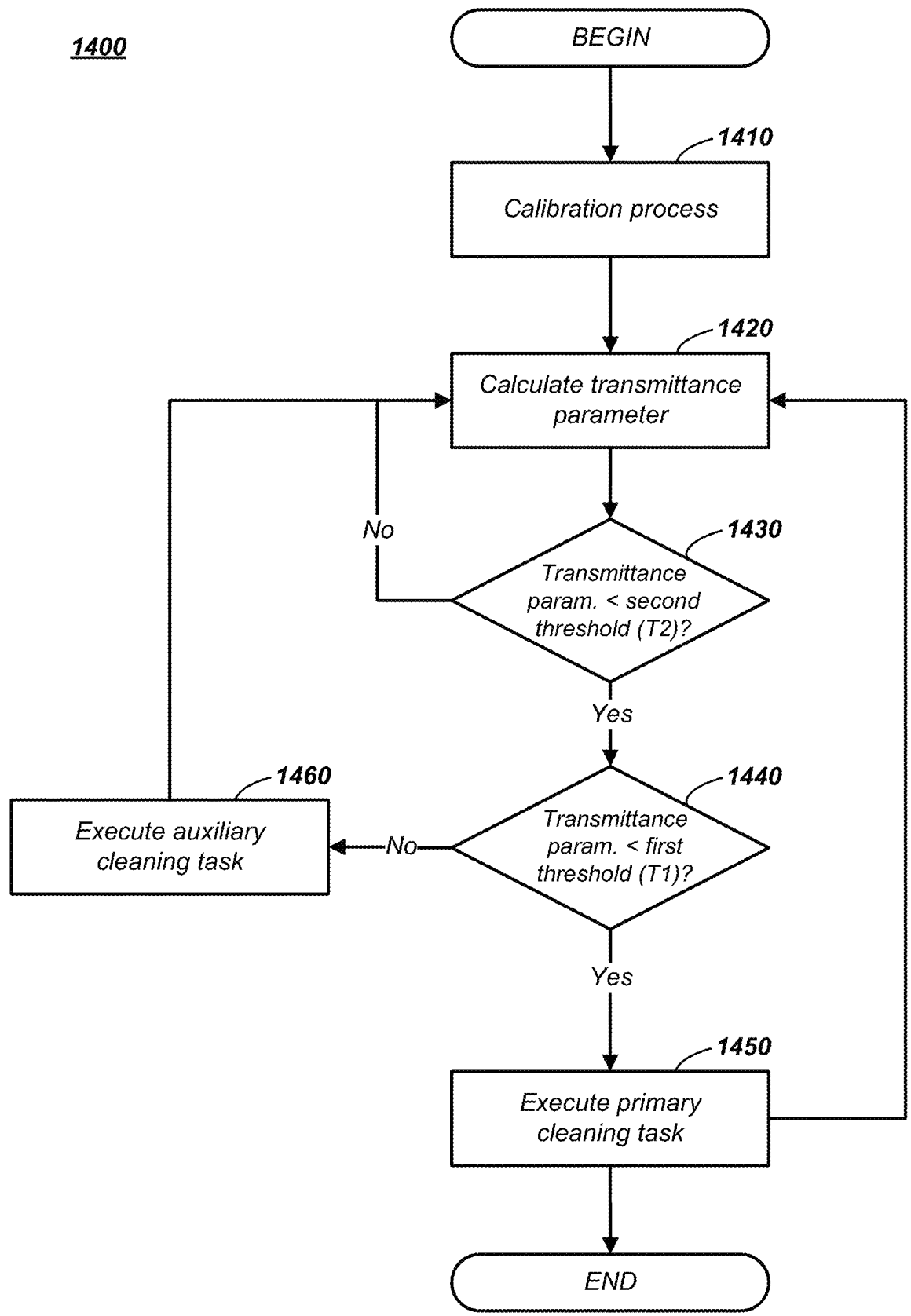
FIG. 14 is a flow diagram illustrating one example of a sensor cleaning process.

Turning now to FIG. 14, a sensor cleaning process 1400 is described. As will be described more below, the process 1400 may enable the first computer and the second computer to execute one or more cleaning tasks. According to one example, ADC 64 may determine a transmittance parameter for each of a plurality of sensors 24-28, ADC 64 may compare the respective transmittance parameter to a transmittance threshold value, and based on the comparison, ADC 64 may instruct the CCM 60 to execute a cleaning task at the respective sensor (e.g., by actuating the PTC shroud 54). According to one example, the process may be identical or similar for each of sensors 24-28; therefore, process 1400 will be described below with respect to a single sensor (e.g., a camera 24). Furthermore, even though two computers (e.g., ADC 64 and CCM 60) are described as executing various instructions, it should be appreciated that in other examples a computing system comprising both the CCM 60 and ADC 64 could execute process 1400.

The process begins with block 1410; in block 1410, a calibration process for camera 24 is executed. According to one example, the calibration process occurs in a laboratory environment—e.g., at a manufacturing or assembly plant of the respective camera 24. In at least some examples, the calibration process 1410 may occur when the camera 24 is mounted on vehicle 10; however, this is not required. Calibration process 1410 may occur in a variety of ways. One technique is shown by way of illustration only in FIG. 15; other examples also exist.

Figure 15:
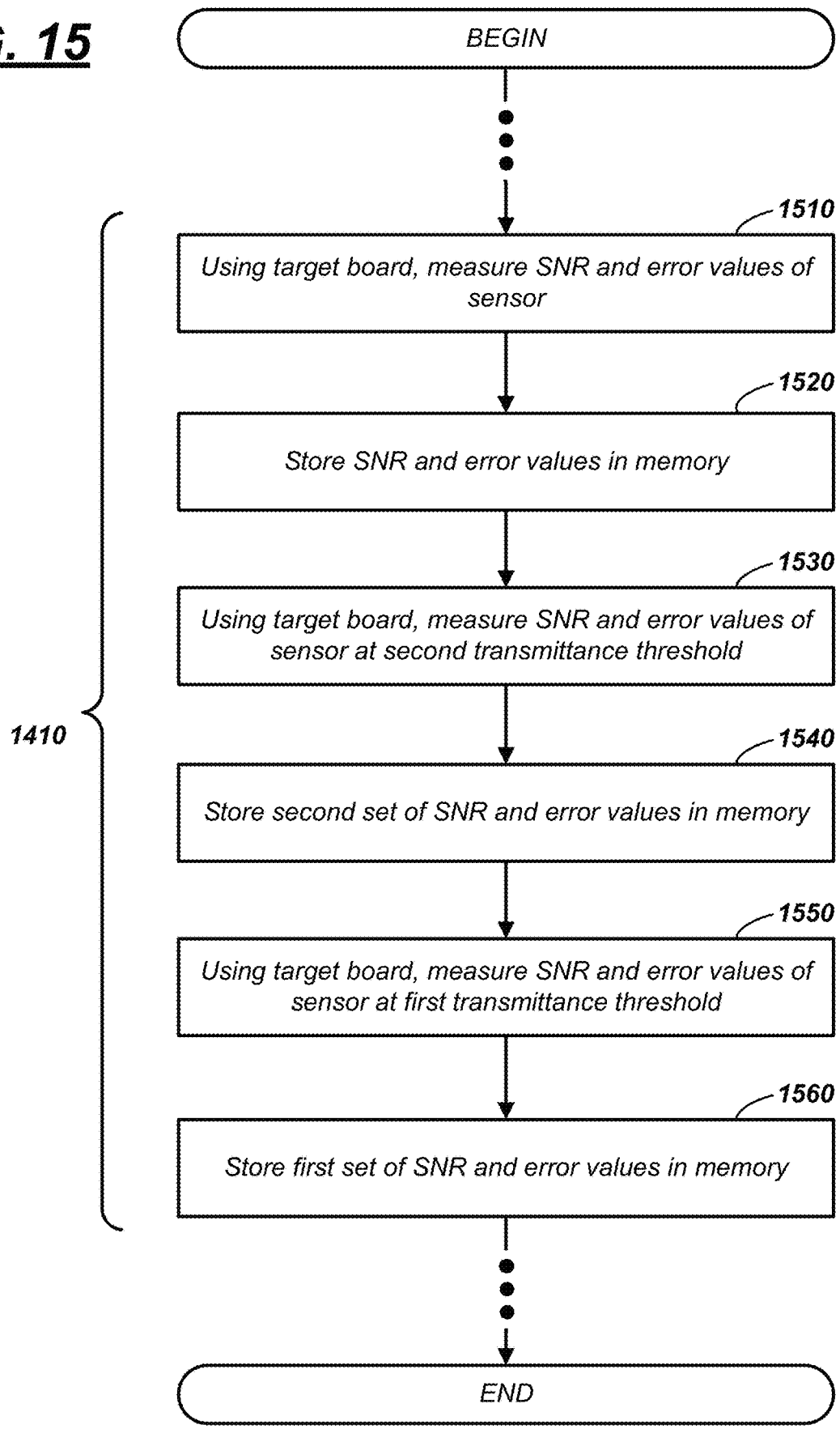
FIG. 15 is a flow diagram illustrating one example of a calibration process of the sensor cleaning process shown in FIG. 14.

In FIG. 15, the calibration process 1410 is illustrated by blocks 1510, 1520, 1530, 1540, 1550, and 1560. In one example, ADC 64 executes blocks 1510-1560. In other examples, a laboratory test computer is used at least partially to execute these blocks. In the calibration process 1410, a target similar to the one shown in the image of FIG. 16 may be used. This is merely an example; other targets may be used instead.

In block 1510, a set of noise values and a set of error values may be measured using camera 24. As used herein, a set of noise values includes one or both of a signal-to-noise (SNR) value and a peak signal-to-noise value (PSNR). As used herein, a set of error values includes one or both of a root mean square error (RMSE) value and a mean absolute error value (MAE). To obtain these values, a reference image and a test image may be used—e.g., images captured by camera 24. For example, as shown in Table I, the reference image may be captured when the camera 24 has a clean cover 52, and the test image may be captured when the cover 52 is removed from the camera 24. Using these images, the noise values (SNR and PSNR) and the error values (RMSE and MAE) of 22.30158118, 27.73345445, 7.96395885, and 7.13704765, respectively, were obtained. This is explained in greater detail in the paragraphs which follow.

correspond to a single reference point (e.g., a one-to-one relationship). In Equations (1)-(4), each of the test points are designated as t(x, y), and each test point has a measured signal value. Using a checkered target board, some signal values may correspond to a 'black portion' of the target and other signal values may correspond to a 'white portion' of the target. [Note: Nx refers to all values of x (e.g., a horizontal axis of the respective image), Ny refers to all values of y (e.g., a vertical axis of the respective image), and max refers to a mathematical operator that determines a maximum value of a function (e.g., such as a maximum of r(x, y) in Equation 2).]

$$SNR(dB) = 10 * \log_{10}\left[\frac{\sum_{0}^{Nx-1}\sum_{0}^{Ny-1}[r(x, y)]^2}{\sum_{0}^{Nx-1}\sum_{0}^{Ny-1}[r(x, y) - t(x, y)]^2}\right] \quad \text{Equation (1)}$$

$$PSNR(dB) = \quad \text{Equation (2)}$$
$$10 * \log_{10}\left[\frac{\max(r(x, y))^2}{\frac{1}{Nx*Ny} * \sum_{0}^{Nx-1}\sum_{0}^{Ny-1}[r(x, y) - t(x, y)]^2}\right]$$

$$RMSE = \sqrt{\frac{1}{Nx*Ny} * \sum_{0}^{Nx-1}\sum_{0}^{Ny-1}[r(x, y) - t(x, y)]^2} \quad \text{Equation (3)}$$

$$MAE = \frac{1}{Nx*Ny} * \sum_{0}^{Nx-1}\sum_{0}^{Ny-1}|r(x, y) - t(x, y)| \quad \text{Equation (4)}$$

Thus, using the reference image and test image (of Table I) and using Equations (1)-(4), a computer may determine, for the given camera 24, an SNR value of 22.30158118, a PSNR value of 27.73345445, a RMSE value of 7.96395885, and a MAE value of 7.13704765. Of course, these values are merely examples. These values may be considered special SNR, PSNR, RMSE, and MAE values—e.g., referred to as

TABLE I

| Reference Image | Test Image | SNR (dB) | PSNR (dB) | RMSE | MAE |
|---|---|---|---|---|---|
| 1 Clean Cover | No Cover | 22.30158118 | 27.73345445 | 7.96395885 | 7.13704765 |
| 2 Clean Cover | Clean Cover | ∞ | ∞ | 0 | 0 |
| 3 Clean Cover | Dirty Cover | 9.73116111 | 15.16303438 | 33.85711984 | 27.41270609 |

More particularly, Equations (1)-(4) may be used to calculate the SNR value, the PSNR value, the RMSE value, and the MAE value, and the values of line 1 reflect noise and error values due to the construction of the cover 52 (in the sample used, the cover 52 was comprised of glass and aberrations and the like in the glass contribute to the listed values of SNR, PSNR, RMSE, and MAE). Notably, in line 2, where both the reference and test images used a clean cover 52, SNR and PSNR approach infinity, whereas RMSE and MAE are approximately zero.

Returning again to the determination of values in line 1, the reference image (e.g., a two-dimensional image) may be sub-divided into a plurality of reference points—e.g., much like a Cartesian grid. Accordingly, each reference point may be identified by r(x,y), and each reference point may have a measured signal value. Each of a plurality of test points may a max SNR value, a max PSNR value, a minimum RMSE value, and a minimum MAE value—e.g., the best expected performance of camera 24.

In block 1520, the max SNR, the max PSNR value, the minimum RMSE value, and the minimum MAE value may be stored in memory 230 of ADC 64. Block 1530 may follow.

While not required, according to one example, two transmittance threshold values may be determined—e.g., a first transmittance threshold value and a second transmittance threshold value. According to one example, the first transmittance threshold value may be associated with actuating the blower 48, the active cooler 58, the PTC shroud 54, and/or jet 96 spraying cleaning solution for the respective camera 24 (e.g., to melt snow and/or ice on cover 52), and the second transmittance threshold value may be associated with actuating the blower 48 and/or the jet 96, but not the PTC shroud 54 (e.g., heating the cover 52 is not desirable in this instance).

In block 1530, the set of noise values and the set of error values may be determined for the second transmittance threshold value. This threshold value may be 75%, 80%, or 85% transmittance, just to list a few examples. For purposes of illustration only, in one example, consider the second transmittance threshold value to be 80%. To determine the noise and error values at the second transmittance threshold value, debris may be applied to the cover 52. Using an optical test bench, a haze measurement may be performed (e.g., using a light source, a baffle, a light trap, one or more reflectors, etc.) and the amount of debris applied may correspond to the second transmittance threshold value.

In block 1540, when the debris applied corresponds to 80% transmittance, then the corresponding SNR value, the corresponding PSNR value, the corresponding RMSE value, and the corresponding MAE value may be recorded and stored in memory 230 of ADC 64. Hereafter, these sets of noise and error values are referred to as second transmittance threshold values (e.g., a second transmittance SNR threshold value, a second transmittance PSNR threshold value, a second transmittance RMSE threshold value, and a second transmittance MAE threshold value).

In block 1550 which follows, the set of noise values and the set of error values may be determined at the first transmittance threshold value. This threshold value may be 60%, 65%, or 70% transmittance, just to list a few examples. For purposes of illustration only, in one example, consider the first transmittance threshold value to be 65%. The first transmittance threshold value may correspond to a minimum threshold for sensor transmittance that has been identified by the Society of Automotive Engineers (SAE), an autonomous vehicle consortium, or the like; i.e., this threshold value may be considered or accepted to be the least acceptable transmittance for operating vehicle 10 in a fully autonomous mode. In at least one example, block 1550 may be carried out similarly to that described in block 1530 (except that the threshold value is different); therefore, this will not be re-described here in detail.

Following block 1550, in block 1560, the SNR, PSNR, RMSE, and MAE values that correspond with the first transmittance threshold value for the respective sensor (camera 24) may be recorded and stored in memory 230 of ADC 64 (e.g., see line 3 of Table I). These sets of noise and error values also may be special; e.g., being referred to as first transmittance threshold values (e.g., a first transmittance SNR threshold value, a first transmittance PSNR threshold value, a first transmittance RMSE threshold value, and a first transmittance MAE threshold value).

Following block 1560, the cover 52 of camera 24 may be cleaned, and the camera 24 may be mounted on vehicle 10. Further, the calibration may be complete, and the process 1400 may continue at block 1420, shown in FIG. 14.

According to one example, a plurality of transmittance values may be predefined for SNR, PSNR, RMSE, and MAE values between the max SNR, the max PSNR value, the minimum RMSE value, and the minimum MAE value and the first transmittance SNR threshold value, first transmittance PSNR threshold value, first transmittance RMSE threshold value, and first transmittance MAE threshold value, respectively. For example, ADC 64 may execute a linear regression or other function to identify these transmittance values (e.g., which may be 65-95%). Other techniques are also possible. These transmittance values also may be stored in memory 230.

Block 1420 may occur during operation of the vehicle 10 in an autonomous mode—e.g., in a fully autonomous mode (e.g., Level 5); however, this is not required in all examples. In block 1420, ADC 64 repeatedly may calculate for camera 24 a transmittance parameter. As used herein, a transmittance parameter is a measure of transmittance, i.e., an amount of undiffused light which passes through the cover 52 and lens 104 for the respective sensor; as discussed above, this value typically changes dependent upon how much debris (e.g., fog, ice, snow, dirt, dust, etc.) is on the cover 52.

To calculate this transmittance parameter, the ADC 64 may receive an image captured by camera 24 and may identify one or more objects therein—e.g., vehicle(s), roadway(s), signage, building(s), other infrastructure, persons, or the like. Using the captured image and a reference image or the like (e.g., also stored in memory 230), ADC 64 may calculate a set of noise values (e.g., a calculated SNR value, a calculated PSNR value, or both) and a set of error values (e.g., a calculated RMSE value, a calculated MAE value, or both)—and compare these noise value(s) and error value(s) to the transmittance threshold value(s). In other instances, the calculated values are used to identify a transmittance value, and this transmittance value is compared to the second transmittance threshold value (in block 1430). Examples follow.

Figure 16:
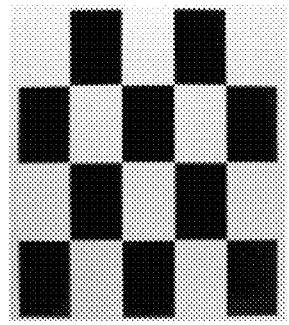
FIG. 16 is an image of target captured through a glass cover.
Figure 17:
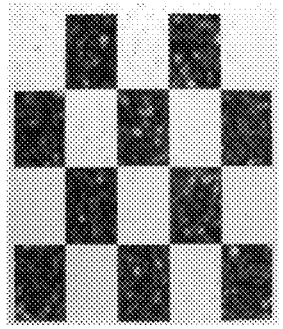
FIGS. 17-19 are images of the target shown in FIG. 16, wherein the cover is at least partially obscured.
Figure 18:
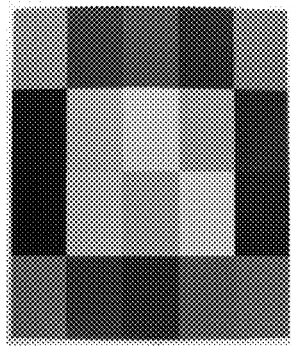
Figure 19:
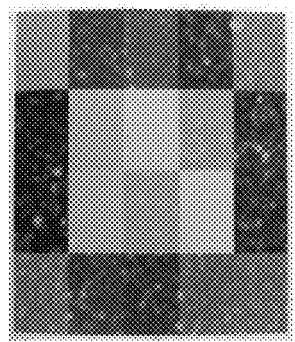

FIGS. 16-19 illustrate examples of captured images, wherein the cover 52 of the camera 24 has differing amounts of debris (here, the cover 52 was comprised of glass). FIG. 16 illustrates an image 600 of a target captured by camera 24—e.g., with little debris. FIGS. 17, 18, and 19 are images 700, 800, 900 of the target—illustrating more or different debris.

Returning to FIG. 14, according to one example of block 1430, ADC 64 compares the calculated values to the second transmittance SNR threshold value, the second transmittance PSNR threshold value, the second transmittance RMSE threshold value, and the second transmittance MAE threshold value, respectively. In this example, if the calculated SNR value is greater than or equal to the second transmittance SNR threshold value, and if the calculated PSNR value is greater than or equal to the second transmittance PSNR threshold value, and if the calculated RMSE value is less than or equal to the second transmittance RMSE threshold value, and if the calculated MAE value is less than or equal to the second transmittance MAE threshold value, then ADC 64 determines that the transmittance parameter is greater than or equal to the second transmittance threshold value, and process 1400 loops back and repeats block 1420—i.e., the transmittance parameter is not less than the second transmittance threshold value (e.g., continuing with the example above, not less than or equal to 80%). Stated differently, if all Equations (5)-(8) are TRUE, then process 1400 loops back to block 1420. And in this example, if any of Equations (5)-(8) are not TRUE, then process 1400 proceeds to block 1440.

$$\text{calculated SNR}_{current\ image} \geq \text{second transmittance SNR threshold value} \quad \text{Equation (5)}$$

$$\text{calculated PSNR}_{current\ image} \geq \text{second transmittance PSNR threshold value} \quad \text{Equation (6)}$$

$$\text{calculated RMSE}_{current\ image} \leq \text{second transmittance RMSE threshold value} \quad \text{Equation (7)}$$

$$\text{calculated MAE}_{current\ image} \leq \text{second transmittance MAE threshold value} \quad \text{Equation (8)}$$

In other examples, both of the noise values and/or both of the error values need not be TRUE in order to loop back to block 1420. For example, in these instances, only one of Equations (5) or (6) need be TRUE for process 1400 to loop back to block 1420. Alternatively, or in combination therewith, only one of Equations (7) or (8) need be TRUE for process 1400 to loop back to block 1420. Still other examples exist.

Figure 20:
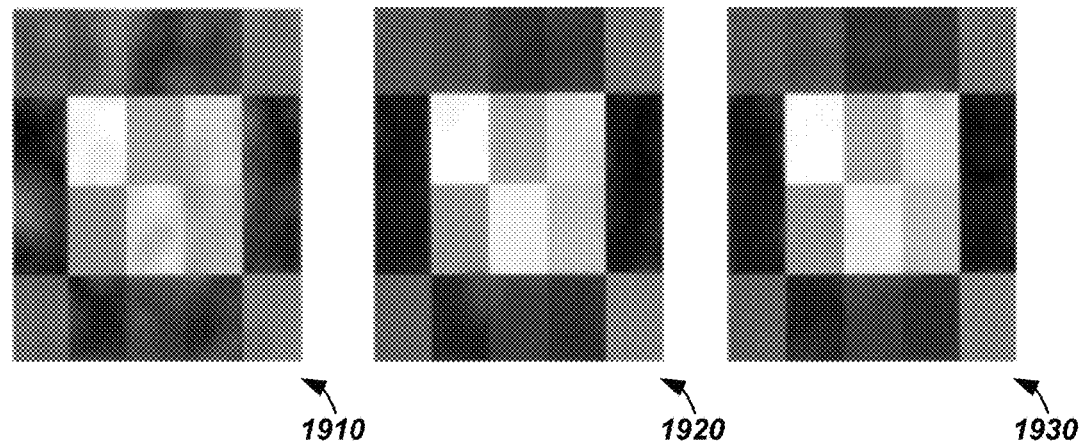
FIG. 20 illustrates three additional examples of images, wherein the cover was at least partially obscured when the image was captured.
Figure 21:
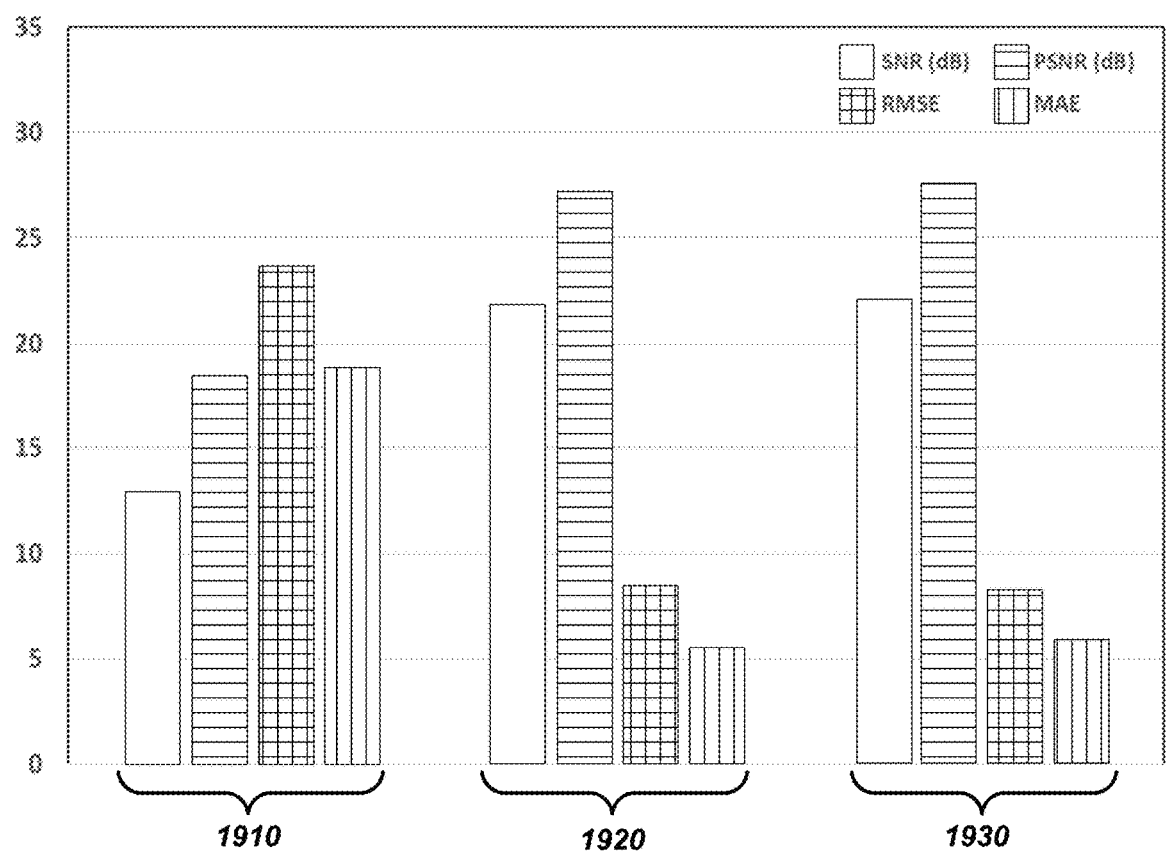
FIG. 21 is a graphical depiction of the SNR, PSNR, RMSE, and MAE of the images shown in FIG. 20.

FIG. 20 illustrates examples of these four calculated values for various captured images. More particularly, the figure illustrates images 1910, 1920, and 1930 (e.g., of a target again). And FIG. 21 is a graphical depiction that corresponds to each of these images 1910-1930. In the graph, for each of images 1910-1930, calculated values of SNR, PSNR, RMSE, and MAE are shown.

Returning to FIG. 14, in block 1440, ADC 64 may determine a first transmittance threshold value. Block 1440 may be determined similarly to block 1430, except that the calculated SNR value, the calculated PSNR value, the calculated RMSE value, and the calculated MAE value (each of block 1420) respectively are compared to the first transmittance SNR threshold value, first transmittance PSNR threshold value, first transmittance RMSE threshold value, and first transmittance MAE threshold value, as shown in Equations (9)-(12).

$$\text{calculated SNR}_{current\ image} \geq \text{first transmittance SNR threshold value} \quad \text{Equation (9)}$$

$$\text{calculated PSNR}_{current\ image} \geq \text{first transmittance PSNR threshold value} \quad \text{Equation (10)}$$

$$\text{calculated RMSE}_{current\ image} \leq \text{first transmittance RMSE threshold value} \quad \text{Equation (11)}$$

$$\text{calculated MAE}_{current\ image} \leq \text{first transmittance MAE threshold value} \quad \text{Equation (12)}$$

Similar to that described above in block 1430, in one example, if each of Equations (9)-(12) are TRUE, then process 1400 proceeds to block 1460. In this example, if any one of Equations (9)-(12) are FALSE, then process 1400 proceeds to block 1450.

In block 1450, a primary cleaning task is executed; i.e., upon ADC 64 determining to proceed to block 1450, ADC 64 may command the CCM 60 to perform the primary cleaning task. As used herein, a primary cleaning task includes providing electrical power to the PTC shroud 54 so that, if the temperature of the PTC shroud 54 is below its temperature-sensitive threshold, the PTC shroud 54 will heat the cover 52 (e.g., so that debris can be removed). Of course, as discussed above, primary cleaning task also may include one or more of blowing air across the sensor (e.g., using blower 48) or spraying liquid across the sensor (e.g., via jet 96).

In block 1460, an auxiliary cleaning task is executed; i.e., upon ADC 64 determining to proceed to block 1460, ADC 64 may command the CCM 60 to perform the auxiliary cleaning task. As used herein, an auxiliary cleaning task means to provide a fluid at cover 52, but not to electrically actuate PTC shroud 54. For example, CCM 60 may control blower 48 to force air across camera 24 and/or control jet 96 to spray a liquid cleaning solution at the cover 52; however, the PTC shroud 54 is not provided electrical current.

Following either block 1450 or block 1460, the process 1400 may loop back to block 1420. Alternatively, following block 1450, the process may end.

In other examples of process 1400, block 1440 may determine that the transmittance parameter is less than the first transmittance threshold value by determining that one of Equation (9) or (10) is TRUE—and/or by determining that one of Equation (11) or (12) is TRUE. Still other examples exist. For example, other temperature sensor data, humidity sensor data, rain sensor data, and the like may be received and used by ADC 64 to improve the operation of process 1400.

Thus, there has been described an imaging system that comprises at least one sensor having a cover and a positive temperature coefficient (PTC) shroud on the cover. The PTC shroud may warm the cover consistent with the thermal properties of the PTC material. Further, a computer-implemented process is described that includes actuating the PTC shroud based on a transmittance parameter of the sensor.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
a processor; and
memory storing instructions, executable by the processor, that comprise, to:
receive, from a sensor coupled to the processor, an image;
determine a transmittance parameter of the image; and
when the transmittance parameter is less than a transmittance threshold value, then actuate a positive temperature coefficient (PTC) shroud of the sensor, wherein the transmittance threshold value is based on a set of noise values and a set of error values.

2. The system of claim 1, further comprising a computer, wherein the instructions further comprise, to: command the computer to actuate the PTC shroud.

3. The system of claim 1, wherein the sensor comprises an active cooler electrically coupled to the PTC shroud, and the instructions further comprise, to: when the transmittance parameter is less than a transmittance threshold value, then actuate the PTC shroud by actuating the active cooler to an ON state.

4. The system of claim 1, wherein the transmittance threshold value comprises a first transmittance threshold value, and further comprising, to: actuate the PTC shroud when the transmittance parameter is less than the first transmittance threshold value, and not actuate the PTC shroud when the transmittance parameter is greater than the first transmittance threshold value.

5. The system of claim 4, wherein the instructions further comprise, to: when the transmittance parameter is greater than the first transmittance threshold value and less than a second transmittance threshold value, then actuate at least one of a blower or a jet.

6. The system of claim 1, wherein the instructions further comprise, to: use data from the sensor to operate a vehicle in an autonomous mode.

7. The system of claim 1, further comprising: the sensor, wherein the sensor comprises a cover carrying the PTC shroud and an active cooler electrically coupled to the PTC shroud, wherein, when the active cooler is in an ON state, current is provided to the PTC shroud.

8. The system of claim 7, wherein the active cooler is a thermoelectric cooler.

9. The system of claim 1, wherein the sensor comprises a cover, wherein the PTC shroud is located at a periphery of the cover.

10. The system of claim 1, further comprising:
a housing that carries the sensor in a passage thereof; and
a blower,
wherein, when the blower is in an ON state, the active cooler is actuated to the ON state and air heated by the sensor is moved out of the housing.

11. The system of claim 10, wherein the housing is mounted to a roof of a vehicle.

12. A method, comprising:
storing a transmittance threshold value in memory, wherein the transmittance threshold value is associated with autonomous vehicle operation;
determining to actuate a positive temperature coefficient (PTC) shroud of a sensor when a transmittance parameter is less than the transmittance threshold value; and
actuating the PTC shroud based on a transmittance parameter of the sensor.

13. The method of claim 12, wherein the sensor comprises a cover, wherein the PTC shroud is located at a periphery of the cover.

14. The method of claim 12, further comprising: using data from the sensor to operate a vehicle in an autonomous mode.

15. A method, comprising:
for an image of a sensor comprising a positive temperature coefficient (PTC) shroud, determining a signal-tonoise (SNR) value, a peak SNR (PSNR) value, a root mean square error (RMSE) value, and a mean absolute error (MAE) value; and based on the SNR, PSNR, RMSE, and MAE values, actuating the PTC shroud.

16. The method of claim 15, further comprising:

comparing the SNR value, the PSNR value, the RMSE value, and the MAE value to a transmittance SNR threshold value, a transmittance PSNR threshold value, a transmittance RMSE threshold value, and a transmittance MAE threshold value, respectively;

determining that:
- the SNR value<the transmittance SNR threshold value,
- the PSNR value<the transmittance PSNR threshold value,
- the RMSE value>the transmittance RMSE threshold value, and
- the MAE value>the transmittance MAE threshold value; and then, actuating the PTC shroud.

17. The method of claim 15, further comprising:

correlating a transmittance parameter to the SNR value, the PSNR value, the RMSE value, and the MAE value;

determining that the transmittance parameter is less than a threshold; and then, actuating the PTC shroud.

18. The method of claim 15, wherein the sensor comprises a cover, wherein the PTC shroud is located at a periphery of the cover.

19. The method of claim 15, further comprising: using data from the sensor to operate a vehicle in an autonomous mode.

* * * * *